Aug. 14, 1923.

O. R. BRINEY 1,465,181

LOCKING MEANS FOR GUIDE BUSHINGS

Filed March 9, 1921

INVENTOR
Ottis R. Briney
BY
ATTORNEY

Patented Aug. 14, 1923.

1,465,181

UNITED STATES PATENT OFFICE.

OTTIS R. BRINEY, OF CLEVELAND, OHIO.

LOCKING MEANS FOR GUIDE BUSHINGS.

Application filed March 9, 1921. Serial No. 450,935.

*To all whom it may concern:*

Be it known that I, OTTIS R. BRINEY, a citizen of the United States, and residing at Cleveland, county of Cuyahoga, and State of Ohio, have invented a new and useful Locking Means for Guide Bushings, of which the following is a specification.

My invention relates to locking means in which the liner and the slip bushings of guide bushings are locked to each other without any external or auxiliary mechanism to accomplish such locking.

The object of my invention is to provide an economical, efficient, and positive means for locking such bushings to each other.

I attain this object by forming one or more of the bushings with an eccentric portion and arrange the bushings so that a rotative movement between them will lock them to each other either rotatively or longitudinally or both.

In order to thoroughly illustrate my invention, I have applied the same to drill bushings and modifications thereof in the accompanying drawings and the description thereof.

Figure 1:
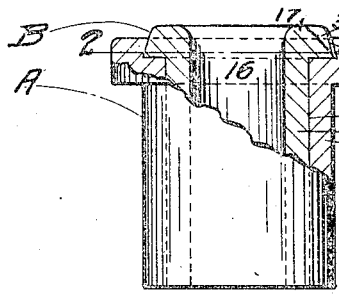
Figure 2:
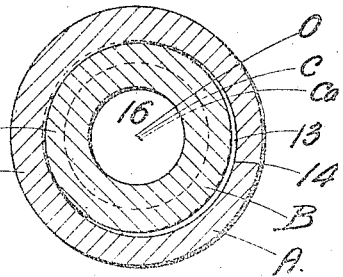
Figure 3:
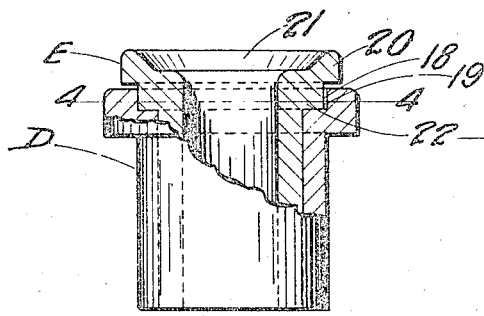
Figure 4:
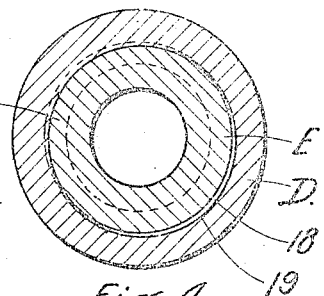
Figure 5:
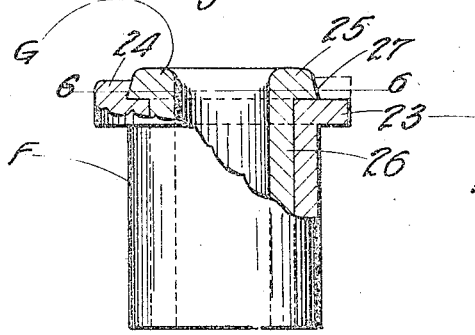
Figure 6:
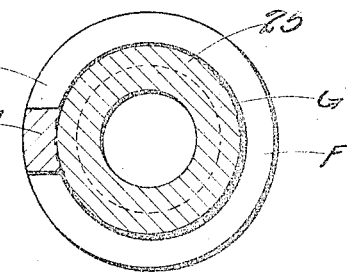
Figure 7:
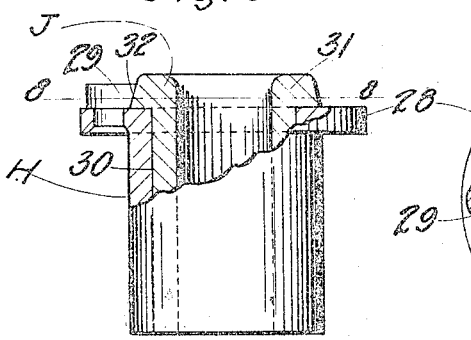
Figure 8:
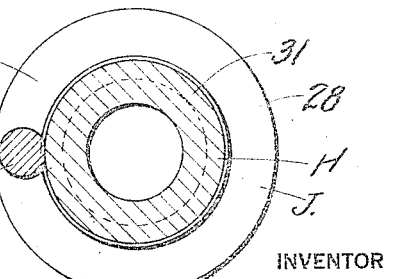

In the accompanying drawings, Fig. 1 is a general side view of a drill bushing, partly in section; Fig. 2 is a section on line 2—2 of Fig. 1; Fig. 3 is a general side view of a modified drill bushing partly in section; Fig. 4 is a section on line 4—4 of Fig. 3; Fig. 5 is a general side view of a modified drill bushing partly in section; Fig. 6 is a section on line 6—6 of Fig. 5; Fig. 7 is a general side view of a modified drill bushing partly in section; and Fig. 8 is a section on line 8—8 of Fig. 7.

Similar reference characters refer to similar parts throughout the views.

Referring now particularly to Figs. 1 and 2 which illustrate a liner and a slip bushing formed to be locked to each other positively, both rotatively and longitudinally. The liner bushing A shown here has the body 10 the outer surface whereof may be fitted to any suitable jig or fixture, and the bore 11 preferably concentric with the body, and the collar 12, and the counterbore 13 the circumferential wall 14 of which is inclined as shown. This counterbore 13 is eccentric with the bore 11.

The slip bushing B has the body 15, the bore 16 preferably concentric with the body, and the collar 17 which has its outer circumference inclined to the same degree as the wall 14. This collar 17 is formed eccentric with the body 15 and is slightly smaller in diameter than the counterbore 13 and, preferably, the eccentricity thereof corresponds to the eccentricity of the counterbore 13 altho this is not necessary. When assembling the two bushings, the slip bushing collar 17 will readily enter the counterbore 13 when the centers C and Ca coincide and when the body 15 is in the bore 11.

Both bushings may be made of any suitable material and hardened and ground when desired.

After the bushings A and B are made up as specified, the body 15 of the bushing B is inserted into the bore 11 and the counterbore 13 will receive the collar 17 when the centers C and Ca and consequently the eccentric portions of both bushings coincide. Then, when either the bushing A or B is given a rotative movement in either right hand or left hand direction, the bodies 10 and 15 remain on the normal axis O but the radially longer radius of the collar 17, considered from the normal axis O, travels toward the radially shorter radius of the counterbore 13, also considered from the normal axis O, and the outer circumference of the collar 17 will engage the wall 14 of the counterbore 13 and positively lock the two bushings together.

When the bushings are so locked, independent rotation thereof is prevented but both bushings may rotate in unison when so desired. The bushing B can not move longitudinally out of the bushing A due to the inclination of the wall 14 and the collar 17.

Referring now to Figs. 3 and 4 which show a modification. This device consists of the liner bushing D having the eccentric counterbore 18 which, in this instance, has the wall 19 parallel with the body, and the slip bushing E having the head 20, the lubricant receptacle 21 and the eccentric collar 22. The lubricant receptacle 21 is provided for the purpose of localizing the lubricant to where it is needed and prevent the same from spreading over the jig.

The eccentricity, mode of operation, and other general features not particularly pointed out here are similar to those set forth in the description of Figs. 1 and 2.

This modification is somewhat cheaper to manufacture owing to the parallel wall 19, but the longitudinal locking feature between the bushings D and E is not as positive as that of Figs. 1 and 2 although there is sufficient friction between the wall 19 and the collar 22, when locked, to prevent longitudinal movement to a certain extent and to warrant its application in many instances.

Referring now to Figs. 5 and 6 which show another modification. This device consists of the liner bushing F and slip bushing G. The liner bushing F has the collar 23 which may, conveniently, be machined to the dot and dash lines shown and then have a portion thereof cut away to leave the projection 24. The slip bushing G has the collar 25 eccentric with the body 26 and also has an inclined outer circumference 27 similar to the collar 17 of Fig. 1. In this instance, the collar 25 bears against the projection 24 when the apparatus is in locked position.

The eccentricity, mode of operation, and other features not particularly pointed out here are similar to those described in connection with Figs. 1 and 2.

Referring now to Figs. 7 and 8 which show another modification. This device consists of the liner bushing H and the slip bushing J. The bushing H has the flange 28 provided with a hole into which the shouldered pin 29 is riveted in proper relation to the central bore 30. The bushing J has the eccentric collar 31 with inclined circumference. The pin 29 has the inclined flat face 32 adapted to the inclination of the collar 31. The eccentricity, mode of operation, and other features not particularly pointed out here are similar to those described in connection with Figs. 1 and 2.

This device, as well as the one shown in Figs. 5 and 6 are somewhat cheaper to manufacture than those previously shown. In Figs. 5 and 6, the counterbore in the collar 23 need not be eccentric which feature is somewhat cheaper to manufacture but an additional operation is required to remove the material of the cut away portion. The device shown in Figs. 7 and 8 is somewhat cheaper to manufacture than the former ones since the counterbore is eliminated and it is not necessary to remove any material as in Figs. 5 and 6. But this device is not quite as strong as the former ones and will answer the purpose in many instances where strength is not necessary.

The devices herein described and illustrated are economical of manufacture; positive of operation; simple of construction; nothing to get out of order; need no accessory locking member; lock right or left handed or longitudinally or both; and a member rotating inside of these devices will not loosen the lock but rather tighten the same.

I claim:

1. In a guide bushing, the combination of, a slip bushing provided with an eccentrically disposed projection having an inclined surface, and an abutment means having an inclined surface to engage said inclined surface on said slip bushing by a rotative movement of said slip bushing and bind said slip bushing by both endwise and lateral pressure.

2. A guide bushing comprising, a slip bushing composed of a body and an eccentric collar on the end of this body and the outer circumferential surface of this collar inclined, and a liner bushing composed of a body and means on the end of this body to engage the inclined surface of said eccentric collar by a rotative movement of said slip bushing and bind said slip bushing by both endwise and lateral pressure.

3. A guide bushing comprising, a liner bushing provided with an eccentric counterbore having an inclined circumferential wall, and a slip bushing provided with an eccentric collar having an inclined surface to engage said inclined wall by a rotative movement of said slip bushing and bind said slip bushing by both endwise and lateral pressure.

OTTIS R. BRINEY.